United States Patent [19]
McCarty

[11] Patent Number: 4,820,163
[45] Date of Patent: Apr. 11, 1989

[54] ARTIST'S AID

[76] Inventor: Lorraine C. McCarty, 1112 Pinehurst, Royal Oak, Mich. 48073

[21] Appl. No.: 154,093

[22] Filed: Feb. 9, 1988

[51] Int. Cl.$^4$ ............................................. G09B 11/00
[52] U.S. Cl. ........................................ 434/81; 33/1 K
[58] Field of Search ....................... 434/81, 84, 85, 90, 434/91, 98, 87; 33/1 F, 1 K

[56] References Cited

U.S. PATENT DOCUMENTS

| | | | |
|---|---|---|---|
| 1,612,791 | 1/1927 | Ames et al. | 434/98 X |
| 2,193,518 | 3/1940 | Lubin | 434/90 |
| 2,528,765 | 11/1950 | Lindberg | 434/87 |
| 3,384,983 | 5/1968 | Olson | 434/98 |
| 4,400,161 | 8/1983 | Gerlt | 434/104 |

OTHER PUBLICATIONS

Liquitex Value Finder, ©1980, Binney & Smith, Inc.

Primary Examiner—William H. Grieb
Attorney, Agent, or Firm—Basile, Hanlon

[57] ABSTRACT

An artist's aid comprising a sheet member which includes a transparent green filter for determining the differences in reflected light among various surfaces appearing in a visual field, a square aperture for framing a selected portion of the visual field, a circular aperture for visually isolating a relatively small portion of an object appearing in the visual fields, and three apertures arranged at the vertices of a triangle for visually separating a plurality of objects appearing inthe visual field.

15 Claims, 1 Drawing Sheet

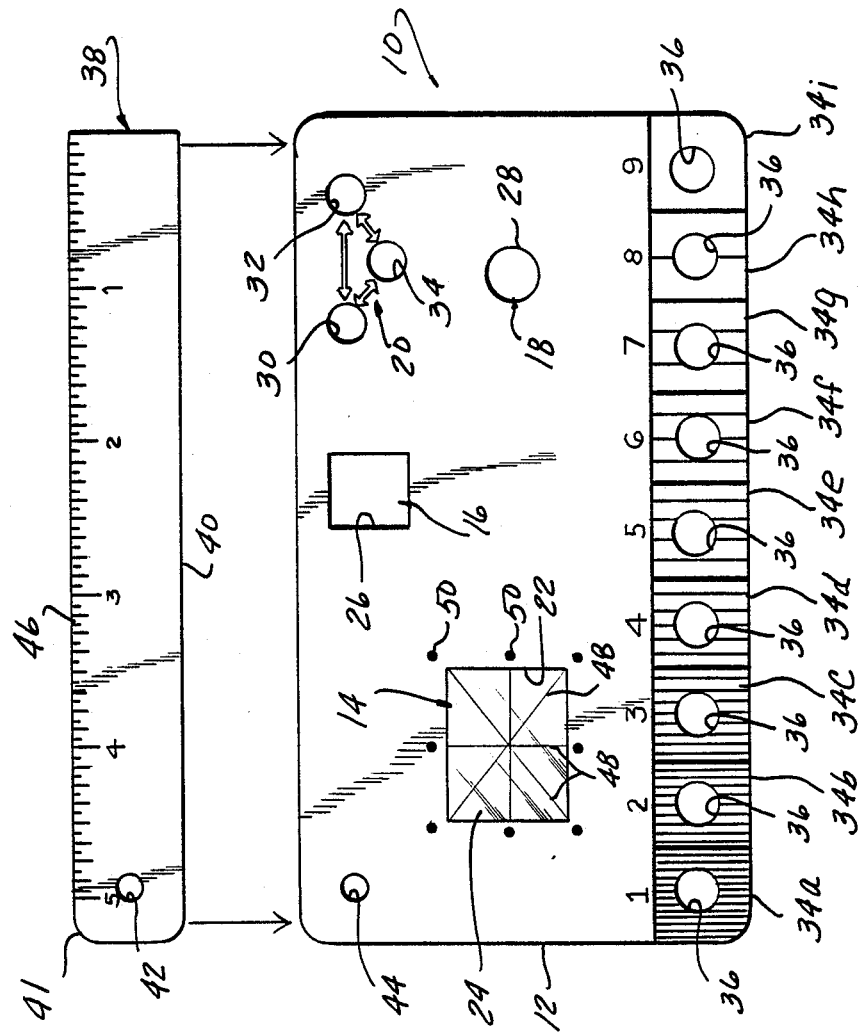

ARTIST'S AID

BACKGROUND OF THE INVENTION

1. Field of the Invention:

This invention relates in general to the graphic arts including painting and sketching and in particular to a device which assists the artist in various tasks such as matching tone, framing, isolating small regions of color on a larger object, determining perspective, etc.

2. Discussion of the Prior Art:

The tasks faced by an artist attempting to produce an aesthetically pleasing artistic creation by the viewing of natural objects in the environment are varied and difficult. For example, if working in a color medium, the artist may decide to attempt to reproduce the actual color of the natural object. In order to do so, he must not only determine the actual hue of the color of the object (that is, whether it is red, blue, green, etc.) and how saturated the color is, but he must also determine the value of the color, that is, the amount of light reflectance from the object. While the artist may attempt such a color matching by use of a set of color standards such as is found in U.S. Pat. Nos. 1,612,791 and 3,384,983, such devices tend to be somewhat cumbersome to carry and awkward to use.

Many artists do not need a complete set of color samples to successfully reproduce the color of an object in the environment. Frequently, the artist may be able to successfully determine the correct hue and saturation of the color of the object without the aid of such devices as are described in the above-referenced patents. However, it is not unusual for the artist to have difficulty in determining the correct color value or degree of reflectance of the object. The factors of hue and saturation tend to distract the eye and prevent a correct determination of color value from being made. While some artists use a conventional gray scale, which typically comprises a series of sequentially graded fields ranging from black to white, again, it is difficult to match the actual colored object with the uncolored field which most correctly matches the value of the object.

The artist may encounter additional problems, such as determining the perspective of the objects in his visual field and how to reproduce the correct perspective on a flat sheet of paper. He may require assistance in correctly framing that portion of his visual field which is of interest. Since most objects are not of a uniform overall color, but are composed of a number of smaller areas of varying colors, the artist may wish to visually isolate a small area of an object in order to ascertain its correct color. Additionally, if he wishes to artistically depict a plurality of objects which appear in his visual field, it may be helpful to be able to visually separate the plurality of objects in order to ascertain their correct visual relationship to each other.

Thus, it would be desirable to provide a device which provides an easy way of determining the correct color value or degree of refractance of an object or objects in an artist's visual field.

It would also be desirable to provide a device which incorporates a number of artist's aids into a single device which is convenient and easy to use.

It would also be desirable to provide such a device which is portable, easily storable, and relatively inexpensive to produce and to purchase.

SUMMARY OF THE INVENTION

The herein device is an artist's aid which is comprised of a sheet member, preferably formed of a material such as cardboard, plastic, plastic coated paper, etc. The sheet member of the instant device includes a number of visual aids disposed thereon assist the artist. Means are provided for determining the differences in reflected light among various surfaces appearing in the artist's visual field. Means for framing a selected portion of the visual field are provided. Means for isolating a relatively small portion of an object appearing in said visual field in order to determine its correct color are also provided. Finally, means for visually separating a plurality of objects appearing in the visual field are provided.

It is contemplated that the means for determining the differences in reflective light or color value among various surfaces in the visual field comprises a rectangular aperture formed in the sheet member. The rectangular aperture is covered with a transparent green filter, preferably formed of a material such a transparent plastic. As further assistance to the artist, the aperture may be provided around its periphery with a plurality of spaced apart dots. The green filter may have disposed thereon a plurality of cross-hairs, the cross-hairs being aligned with the plurality of spaced dots.

In another embodiment of the artist's aid of the instant invention, the means for framing a selected portion of the visual field comprises a square aperture formed in the sheet member. The means for visually isolating a relatively small portion of the object to determine its correct color may comprise a circular aperture formed in the sheet member. Furthermore, the means for visually separating a plurality of objects appearing in the visual field may comprise a group of three circular apertures arranged at the vertices of an isosceles right triangle formed in the sheet member.

In another embodiment of the instant invention, the artist's aid may further comprise a conventional gray scale disposed adjacent an edge of the sheet member. The conventional gray scale is comprised of a plurality of fields sequentially graded from black to white. Each field has an aperture formed therein, and the plurality of fields is numbered in order from darkness to lightest. This apertured gray scale provides another aid to the artist for determining the degree of reflectance for a given surface in the visual field.

In yet another embodiment of the instant invention, the artist's aid may further comprise a means for measuring lengths, angles and perspective. The measuring means typically comprises a long rectangular member pivotally attached at one end thereof to a corner of the sheet member. The rectangular member has markings disposed on an edge thereof to form a ruler.

BRIEF DESCRIPTION OF THE DRAWING

The advantages, features and other uses of the present invention will become more apparent by referring to the following detailed description and drawing in which:

The FIGURE is a front view of a preferred embodiment of the artist's aid of the present invention.

DESCRIPTION OF THE PREFERRED EMBODIMENTS

Referring now to the FIGURE, there is shown an artist's aid 10 which is useful to an artist to assist the artist in making various visual determinations. The artist's aid 10 comprises a sheet member 12 having the rectangular shape depicted. Preferably, the corners are rounded. Formed in the sheet member 12 is means 14 for determining differences in reflective light along various surfaces appearing in the artist's visual field. The determining means 14 comprises a rectangular aperture 22 disposed on the left center of the sheet 12, the rectangular aperture 22 being covered with a transparent green filter 24. Disposed around the periphery of rectangular aperture 22 are a plurality of evenly spaced dots 50. Each of the plurality of dots 50 aligns with one of a plurality of cross-hairs 48 disposed on transparent green filter 24. Preferably, the transparent green filter 24 passes light having wavelengths ranging between 4,912 to 5,750 angstrom units.

Means 16 for framing a selected portion of the visual field is formed in the sheet member 12 near the top thereof. The means for framing 16 comprises a square aperture 26 formed in sheet member 12. Means 18 are provided for visually isolating a relatively small portion of an object appearing in the visual field to assist in further color determination. The isolating means 18 comprises an aperture 28 located on the right hand side of sheet member 12 approximately half-way down the height thereof.

Separating means 20 are provided for visually separating a plurality of objects appearing in the visual field. The separating means 20 comprises a group of three circular apertures 30, 32, 34 arranged at the vertices of an isosceles right triangle formed in the sheet member 12 adjacent the upper right corner thereof.

A plurality of fields 34a–34i sequentially graded from black to white to form a gray scale are formed adjacent the lower edge of sheet member 12. Each of said plurality of fields 34a–34i has an aperture 36 formed in the center thereof. The plurality of fields 34a–34i are numbered in order, the darkest being number 1 and the lightest being numbered 9.

The artist's aid 10 also includes means 38 for measuring and lengths, angles and perspectives. The measuring means 38 comprises a long rectangular member 40 pivotally attached at one end 41 thereof the upper left corner of the sheet member 12. Apertures 42 and 44 are formed in the rectangular member 46 and the sheet member 12, respectively, and are alignable with each other. A conventional fastening means (not depicted) may be inserted through the aligned apertures 42, 44 to provide a pivotal connection between the rectangular member 40 and the sheet member 12.

Although not shown, a reflecting area or surface may be provided on the sheet 12. The reflecting surface preferably is dark so as to eliminate detail and provide value in the reflected image.

The artist's aid 10 may be used in a variety of ways to assist the artist in making visual determinations. For example, if the artist desires to determine the relative values of the various colors of objects appearing in the visual field, he may hold the artist air 10 in front of him, with the determining means 14 positioned in front of his eyes. He will then view the visual field through the green filter 14. Because the green filter 14 filters out all but lightwaves of the defined range, the objects which the artist's sees through the green filter 14 will more readily display their relative color values because the hue or chroma thereof will be almost entirely cancelled out. This feature is of great assistance to the artist who must often make relatively fine distinctions in value between different colors of widely different hues. Heretofore, this determination has often been difficult. By using the cross-hairs 48 and the plurality of dots 50, the artist may be assisted in determining perspective.

In a like manner, to use the framing means 16, the aperture 26 is simply placed in front of the artist's eye. By holding the artist's aid 10 at a suitable distance, the desired portion of the visual field will be correctly framed. Likewise, the isolating means 18 may be placed in front of the artist's eye. By holding artist's aid 10 at the correct distance, the desired small portion of an object in the visual field will fill all of aperture 28. This will assist the artist in determining the correct color of various small components of a complex color field, as is typically found in natural objects.

In order to use separating means 20, the apertures 30, 32, 34 are aligned with the artist's eye and multiple objects in the visual field of interest. Again, by holding artist's aid 10 at a suitable distance from the eye, each one of a plurality of up to three separate objects will appear in each of apertures 30, 32, 34.

The use of the conventional gray scale 34 will now be described. In order to assist in making a proper determination of the value of the color of an object, the artist may align the object with one of the plurality of apertures 36 and decide whether the value of the object most closely matches the surrounding field, or whether a darker or lighter field would be more appropriate.

The measuring means 38 may be used in a variety of ways. The ruler 46 is used in a conventional manner. By pivoting the rectangular member 40 with respect to the sheet member 12, the lower edge of the measuring device 38 and the upper edge of sheet member 12 may be caused to coincide with an angle of particular interest appearing in the visual field. By holding the pivotal rectangular member 38 at this angle, the identical angle may then be reproduced on paper or canvas. A similar method may be used to assist the artist in obtaining the correct perspective of a three dimensional visual field on the two dimensional medium.

Obviously, the various elements of the herein invention could be arranged upon the sheet member in a wide variety of ways. The embodiment depicted shows what is believed to be one convenient, compact, and desirable arrangement. Doubtless, many others will occur to one skilled in the art. The claims of the herein invention are not limited to the particular arrangement depicted, but rather, cover all possible variations of design, arrangement, relative size, and shape. The herein invention is not limited to the embodiments depicted and described herein, but solely by the claims appended hereto.

I claim:

1. An artist's aid comprising a sheet member including:
    means for determining the differences in reflected light among various surfaces appearing in a visual field, the determining means comprising an aperture formed on the sheet member, the aperture being covered by a transparent filter;
    means for framing a selected portion of said visual field;
    means for visually isolating a relatively small portion of an object appearing in said visual field; and
    means for visually separating a plurality of objects appearing in said visual field, the separating means comprising a plurality of spaced apertures formed in the sheet member and arranged in a predetermined group.

2. The artist's aid of claim 1 wherein the transparent filter is a green filter.

3. The artist's aid of claim 1 wherein the means for framing comprises a square aperture formed in the sheet member.

4. The artist's aid of claim 1 wherein the isolating means comprises a circular aperture formed in the sheet member.

5. The artist's aid of claim 1 wherein the means for separating comprises a group of three circular apertures arranged at the vertices of an isosceles right triangle formed in the sheet member.

6. An artist's aid comprising a sheet member including:
- means for determining the differences in reflected light among various surfaces appearing in a visual field;
- means for framing a selected portion of said visual field;
- means for visually isolating a relatively small portion of an object appearing in said visual field;
- means for visually separating a plurality of objects appearing in said visual field; and
- a plurality of fields sequentially graded from black to white to form a gray scale located adjacent an edge of the sheet member, each of said plurality of fields having an aperture formed therein, said plurality of fields being numbered in order from darkest to lightest.

7. The artist's aid of claim 1 further comprising means for measuring lengths, angles and perspective.

8. The artist's aid of claim 7 wherein the measuring means comprises a long, rectangular member pivotally attached at one end thereof to a corner of the sheet member, said rectangular member having markings disposed along an edge thereof to form a ruler.

9. An artist's aid comprising a sheet member including:
- a rectangular aperture formed therein, said rectangular aperture being covered with a transparent green filter;
- a square aperture formed therein;
- a single circular aperture formed therein; and
- a group of three circular apertures formed therein arranged to form the vertices of an isosceles right triangle.

10. An artist's aid comprising a sheet member including:
- a rectangular aperture formed therein, said rectangular aperture being covered with a transparent green filter;
- a square aperture formed therein;
- a single circular aperture formed therein;
- a group of three circular apertures formed therein arranged to form the vertices of an isosceles right triangle; and
- a plurality of fields sequentially graded from black to white to form a gray scale adjacent an edge of the sheet member, each of said plurality of fields having an aperture formed therein, said plurality of fields being numbered in order from darkest to lightest.

11. The artist's aid of claim 9 further comprising a long, rectangular member pivotally attached at one end thereof to a corner of the sheet member, said rectangular member having markings disposed an edge thereof to form a ruler.

12. The artist's aid of claim 2 wherein the transparent green filter has a plurality of cross-hairs disposed thereon, said cross-hairs aligning with a plurality of spaced apart dots formed in the sheet member adjacent the periphery of the rectangular aperture.

13. The artist's aid of claim 9 wherein the transparent green filter has a plurality of cross-hairs disposed thereon, said cross-hairs aligning with a plurality of spaced apart dots formed in the sheet member adjacent the periphery of the rectangular aperture.

14. The artist's aid of claim 2 wherein the transparent green filter passes light of wave lengths in a range of between 4,912 to 5,750 angstrom units.

15. The artist's aid of claim 9 wherein the transparent green filter passes light of wave lengths in a range of between 4,912 to 5,750 angstrom units.

* * * * *